United States Patent
Yamashita et al.

(10) Patent No.: US 12,176,752 B2
(45) Date of Patent: Dec. 24, 2024

(54) UNINTERRUPTIBLE POWER SUPPLY SYSTEM

(71) Applicant: TMEIC Corporation, Chuo-ku (JP)

(72) Inventors: Yuki Yamashita, Chuo-ku (JP); Tomohiro Tanaka, Chuo-ku (JP)

(73) Assignee: TMEIC Corporation, Chuo-ku (JP)

( * ) Notice: Subject to any disclaimer, the term of this patent is extended or adjusted under 35 U.S.C. 154(b) by 0 days.

(21) Appl. No.: 17/907,726

(22) PCT Filed: Jul. 3, 2020

(86) PCT No.: PCT/JP2020/026201
§ 371 (c)(1),
(2) Date: Sep. 29, 2022

(87) PCT Pub. No.: WO2022/003954
PCT Pub. Date: Jan. 6, 2022

(65) Prior Publication Data
US 2023/0134153 A1 May 4, 2023

(51) Int. Cl.
*H02J 9/06* (2006.01)
*H02J 3/32* (2006.01)
(Continued)

(52) U.S. Cl.
CPC .............. *H02J 9/062* (2013.01); *H02J 3/32* (2013.01); *H02J 9/068* (2020.01); *H02M 1/42* (2013.01);
(Continued)

(58) Field of Classification Search
CPC ................. H02J 3/00; H02J 9/00; H02M 1/00
See application file for complete search history.

(56) References Cited

U.S. PATENT DOCUMENTS

| 5,519,306 A | 5/1996 | Itoh et al. |
| 2004/0125626 A1 | 7/2004 | Kanouda et al. |

(Continued)

FOREIGN PATENT DOCUMENTS

| JP | 49-20637 A | * 2/1974 |
| JP | 7-245955 A | 9/1995 |

(Continued)

OTHER PUBLICATIONS

International Search Report & Written Opinion issued Sep. 8, 2020 in PCT/JP2020/026201, filed on Jul. 3, 2020, 6 pages.

(Continued)

*Primary Examiner* — Rexford N Barnie
*Assistant Examiner* — Joseph N Inge
(74) *Attorney, Agent, or Firm* — Oblon, McClelland, Maier & Neustadt, L.L.P.

(57) ABSTRACT

A plurality of UPSs are connected in parallel between an AC power supply and a load. The UPSs each include a first switch connected between the AC power supply and an AC node. During the first power feeding mode, a control device turns on the first switch, and controls a power conversion device so as to receive AC power from the AC node and generate AC power. During a second power feeding mode, the control device turns off the first switch, and controls the power conversion device so as to receive DC power from a power storage device and generate AC power. When the AC power supply recovers during the second power feeding mode, the control device successively switches the plurality of UPSs to the first power feeding mode by successively turning on a plurality of the first switches each of which corresponds to each of the plurality of UPSs.

3 Claims, 5 Drawing Sheets

(51) Int. Cl.
*H02M 1/42* (2007.01)
*H02M 3/335* (2006.01)
(52) U.S. Cl.
CPC ..... *H02M 3/33584* (2013.01); *H02J 2207/20* (2020.01)

(56) References Cited

U.S. PATENT DOCUMENTS

| 2008/0067872 A1* | 3/2008 | Moth | H02J 9/062 |
| | | | 307/64 |
| 2012/0013193 A1* | 1/2012 | Sato | H02J 9/062 |
| | | | 307/80 |

FOREIGN PATENT DOCUMENTS

| JP | 10-257692 A | 9/1998 |
| JP | 2004-194408 A | 7/2004 |

OTHER PUBLICATIONS

Japanese office action issued Nov. 2, 2021 in JP 2020-562792, 7 pages (with English Translation).
Office Action issued Mar. 15, 2024, in corresponding Indian Patent Application No. 202217055335 (with English Translation), 6 pages.

* cited by examiner

UNINTERRUPTIBLE POWER SUPPLY SYSTEM

TECHNICAL FIELD

The present invention relates to an uninterruptible power supply system.

BACKGROUND ART

Uninterruptible power supplies have been widely used as power supplies for stably supplying AC power to essential loads, such as computer systems. As is disclosed in Japanese Patent Laying-Open No. 10-257692 (PTL 1), for example, an uninterruptible power supply generally includes a converter for converting AC power into DC power, and an inverter for converting DC power into AC power.

While a commercial AC power supply is normal, the converter converts AC power from the commercial AC power supply into DC power, and supplies the DC power to the inverter while charging a power storage device such as a battery. The inverter converts the DC power into AC power and supplies the AC power to a load. When the commercial AC power supply fails, power from the power storage device is supplied to the inverter, so that the inverter continues to supply the AC power to the load.

The uninterruptible power supply described in PTL 1 is configured to implement, when the commercial AC power supply recovers after occurrence of failure, a soft start in which an AC input voltage that is input to the converter is gradually raised over a prescribed raising time, in order to suppress a sudden change in the commercial AC power supply due to a voltage drop and the like. In PTL 1, the converter is controlled so that the AC input voltage is gradually raised and a discharge current of the battery is gradually reduced, and accordingly, a current supplied to the load can be maintained at a constant value.

CITATION LIST

Patent Literature

PTL 1: Japanese Patent Laying-Open No. 10-257692

SUMMARY OF INVENTION

Technical Problem

In some uninterruptible power supplies, a converter has an AC power feeding function of converting AC power from a commercial AC power supply into DC power and supplying the DC power to an inverter, and a battery power feeding function of supplying DC power of a battery to the inverter. This type of uninterruptible power supply is configured to control the converter so as to selectively perform either the AC power feeding function or the battery power feeding function depending on whether or not the commercial AC power supply has failed.

With such a configuration in which the converter is used to serve both the AC power feeding function and the battery power feeding function, components such as a filter and a semiconductor module can be miniaturized. However, because the AC power feeding function and the battery power feeding function cannot be performed simultaneously, when the commercial AC power supply recovers, the converter cannot be controlled so that a discharge current of the battery is gradually reduced while an AC input voltage is gradually raised.

The present invention has been made to solve such a problem, and an object of the present invention is to provide an uninterruptible power supply system in which a soft start can be implemented when an AC power supply recovers, regardless of the configuration of an uninterruptible power supply.

Solution to Problem

In one aspect of the present invention, an uninterruptible power supply system includes a plurality of uninterruptible power supplies connected in parallel between an AC power supply and a load, and a control device that controls the plurality of uninterruptible power supplies. The plurality of uninterruptible power supplies each include a first switch connected between the AC power supply and an AC node, and a power conversion device configured to selectively receive power from one of the AC node and a power storage device, generate AC power, and supply the AC power to the load. The control device sets the plurality of uninterruptible power supplies to a first power feeding mode while the AC power supply is normal, and sets the plurality of uninterruptible power supplies to a second power feeding mode when the AC power supply fails. During the first power feeding mode, the control device turns on the first switch, and controls the power conversion device so as to receive AC power from the AC node and generate AC power. During the second power feeding mode, the control device turns off the first switch, and controls the power conversion device so as to receive DC power from the power storage device and generate AC power. When the AC power supply recovers during the second power feeding mode, the control device successively switches the plurality of uninterruptible power supplies to the first power feeding mode by successively turning on a plurality of the first switches each of which corresponds to each of the plurality of uninterruptible power supplies.

ADVANTAGEOUS EFFECTS OF INVENTION

According to the present invention, an uninterruptible power supply system can be provided in which a soft start can be implemented when an AC power supply recovers, regardless of the configuration of an uninterruptible power supply.

DESCRIPTION OF EMBODIMENTS

Figure 1:
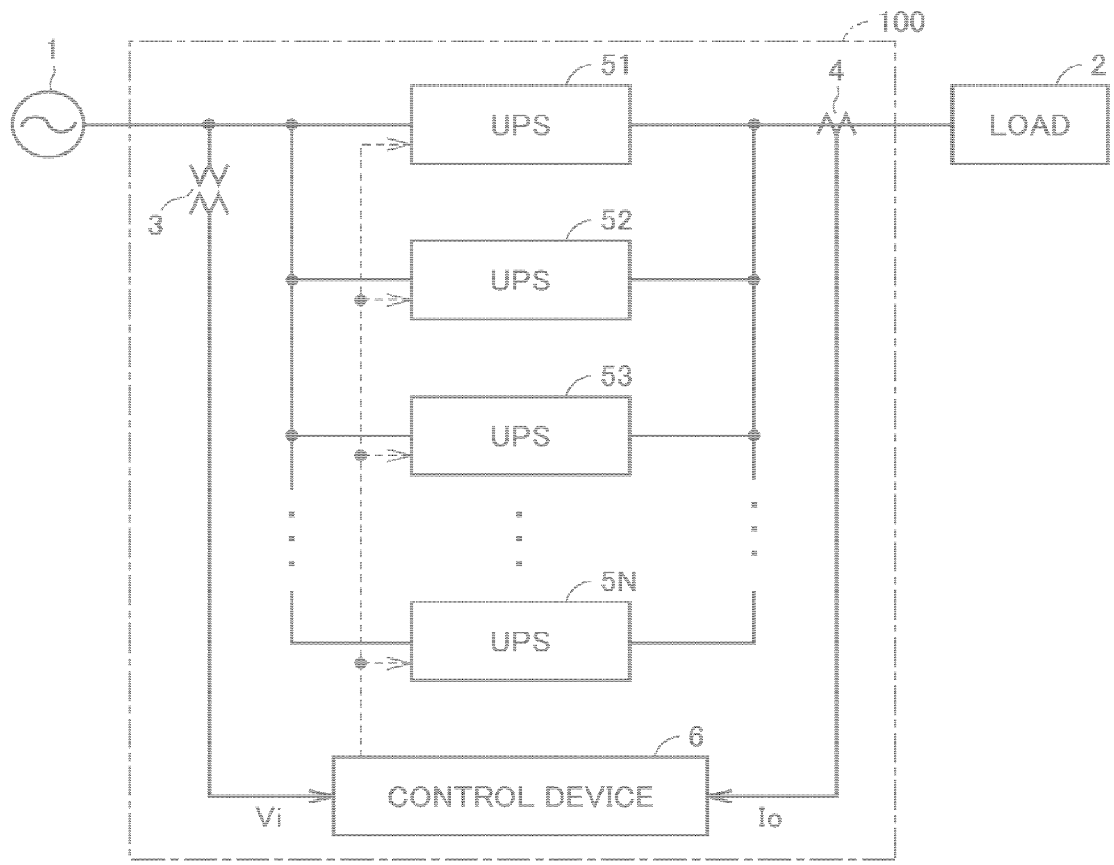
FIG. 1 is a circuit block diagram showing the configuration of an uninterruptible power supply system according to an embodiment.

An embodiment of the present invention will be described hereinafter in detail with reference to the drawings. The same or corresponding parts in the drawings are designated by the same characters and a description thereof will not be repeated in principle.

(Configuration of Uninterruptible Power Supply System)

FIG. 1 is a circuit block diagram showing the configuration of an uninterruptible power supply system according to an embodiment.

Referring to FIG. 1, an uninterruptible power supply system 100 according to the embodiment supplies AC power of a commercial frequency supplied from a commercial AC power supply 1 to a load 2. Commercial AC power supply 1 may be a three-phase AC power supply or a single-phase AC power supply.

Uninterruptible power supply system 100 includes a plurality of uninterruptible power supplies (UPSs) 51 to 5N (N being an integer equal to or greater than two), a voltage detector 3, a current detector 4, and a control device 6.

The plurality of UPSs 51 to 5N are connected in parallel between commercial AC power supply 1 and load 2. The plurality of UPSs 51 to 5N each have the same capacity in the present embodiment. The plurality of UPSs 51 to 5N may have different capacities. In the following description, UPSs 51 to 5N will also be collectively referred to as UPS 5. A number N of UPSs may be any number equal to or greater than two, and can be set to any value depending on load 2.

Voltage detector 3 detects an instantaneous value of an AC input voltage Vi supplied from commercial AC power supply 1, and provides a signal Vi indicating the detected value to control device 6. Current detector 4 detects an AC output current Io flowing from UPS 5 to load 2, and provides a signal Io indicating the detected value to control device 6.

Control device 6 can be implemented by, for example, a microcomputer or the like. As one example, control device 6 has a not-shown memory and a not-shown CPU (Central Processing Unit) embedded therein, and can execute the control operation described below by software processing by the CPU executing a program prestored in the memory. Alternatively, instead of software processing, some or all of the control operation can also be implemented by hardware processing using an embedded dedicated electronic circuit or the like.

Control device 6 controls UPSs 51 to 5N based on AC input voltage Vi, AC output current Io, and the like. Specifically, control device 6 detects whether or not commercial AC power supply 1 has failed based on the detected value of AC input voltage Vi. Control device 6 also controls UPS 5 in synchronization with a phase of AC input voltage Vi.

Figure 2:
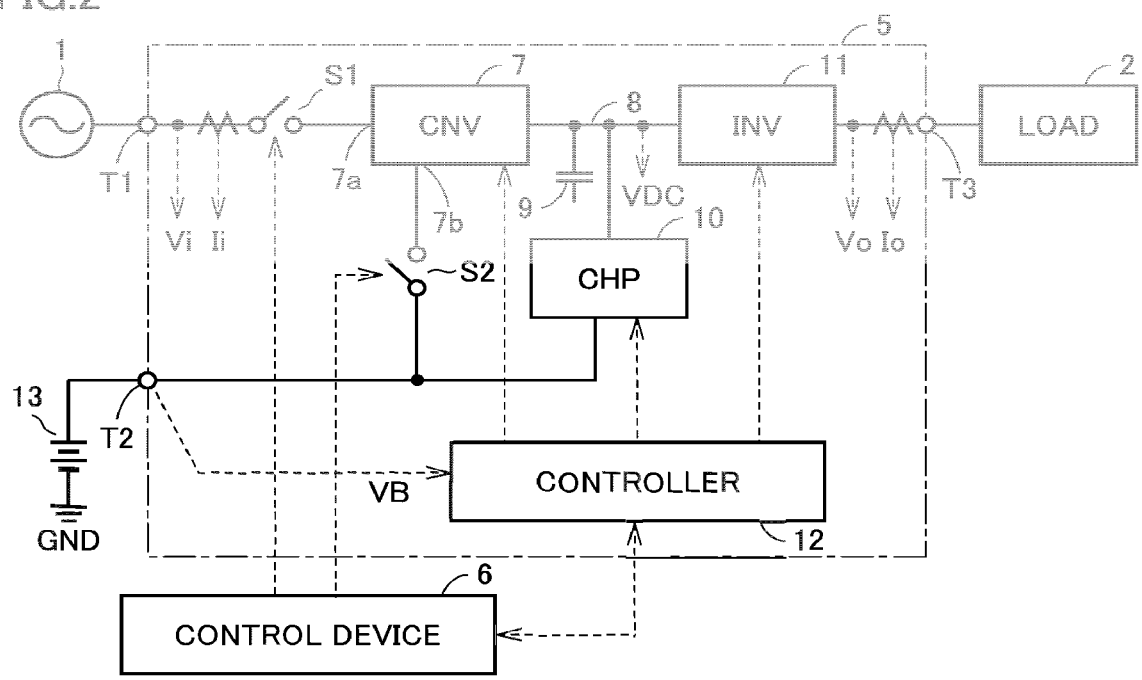
FIG. 2 is a block diagram showing a configuration example of a UPS shown in FIG. 1.

FIG. 2 is a block diagram showing a configuration example of UPS 5 shown in FIG. 1.

As shown in FIG. 2, UPS 5 includes an AC input terminal T1, a battery terminal T2, an AC output terminal T3, a converter 7, a DC line 8, a capacitor 9, a step-down chopper 10, an inverter 11, switches S1, S2, and a controller 12. Converter 7, DC line 8, capacitor 9, step-down chopper 10 and inverter 11 form a "power conversion device."

AC input terminal T1 receives AC power of a commercial frequency from commercial AC power supply 1. Battery terminal T2 is connected to a battery 13. Battery 13 corresponds to an example of "power storage device" storing DC power. A capacitor may be connected instead of battery 13. Battery 13 may be individually connected to each UPS 5, or battery 13 may be commonly connected to the plurality of UPSs 51 to 5N. AC output terminal T3 is connected to load 2. Load 2 is driven by AC power of a commercial frequency supplied from the plurality of UPSs 51 to 5N.

Converter 7, DC line 8 and inverter 11 are connected in series between AC input terminal T1 and AC output terminal T3. Capacitor 9 is connected to DC line 8, and smooths a DC voltage on DC line 8. Step-down chopper 10 is connected between battery terminal T2 and DC line 8.

Switch S1 has a first terminal connected to AC input terminal T1, and a second terminal connected to an AC node 7a of converter 7. Switch S2 has a first terminal connected to battery terminal T2, and a second terminal connected to a DC node 7b of converter 7. Switch S1 corresponds to an example of "first switch," and switch S2 corresponds to an example of "second switch." Turning on (conduction)/off (non-conduction) of switches S1 and S2 is controlled by control device 6.

Although an input filter is provided between the second terminal of switch S1 and AC node 7a of converter 7 and an output filter is provided between inverter 11 and AC output terminal T3 in actual UPS 5, the input filter and the output filter are not illustrated for the sake of simplification of the drawing and the description. The input filter and the output filter are each a low-pass filter including a reactor and a capacitor, which allows a current of a commercial frequency to pass therethrough while blocking a current of a switching frequency.

The instantaneous value of AC input voltage Vi supplied from commercial AC power supply 1 and an instantaneous value of an AC input current Ii flowing through AC input terminal T1 are detected by controller 12. An instantaneous value of an AC output voltage Vo and an instantaneous value of AC output current Io supplied to load 2 are detected by controller 12. An instantaneous value of a DC voltage VDC on DC line 8 is detected by controller 12. An instantaneous value of an inter-terminal voltage VB of battery 13 is detected by controller 12.

Controller 12 controls each of converter 7, inverter 11 and step-down chopper 10 based on AC input voltage Vi, DC voltage VDC, inter-terminal voltage VB, AC output voltage Vo, and the like.

Figure 3:
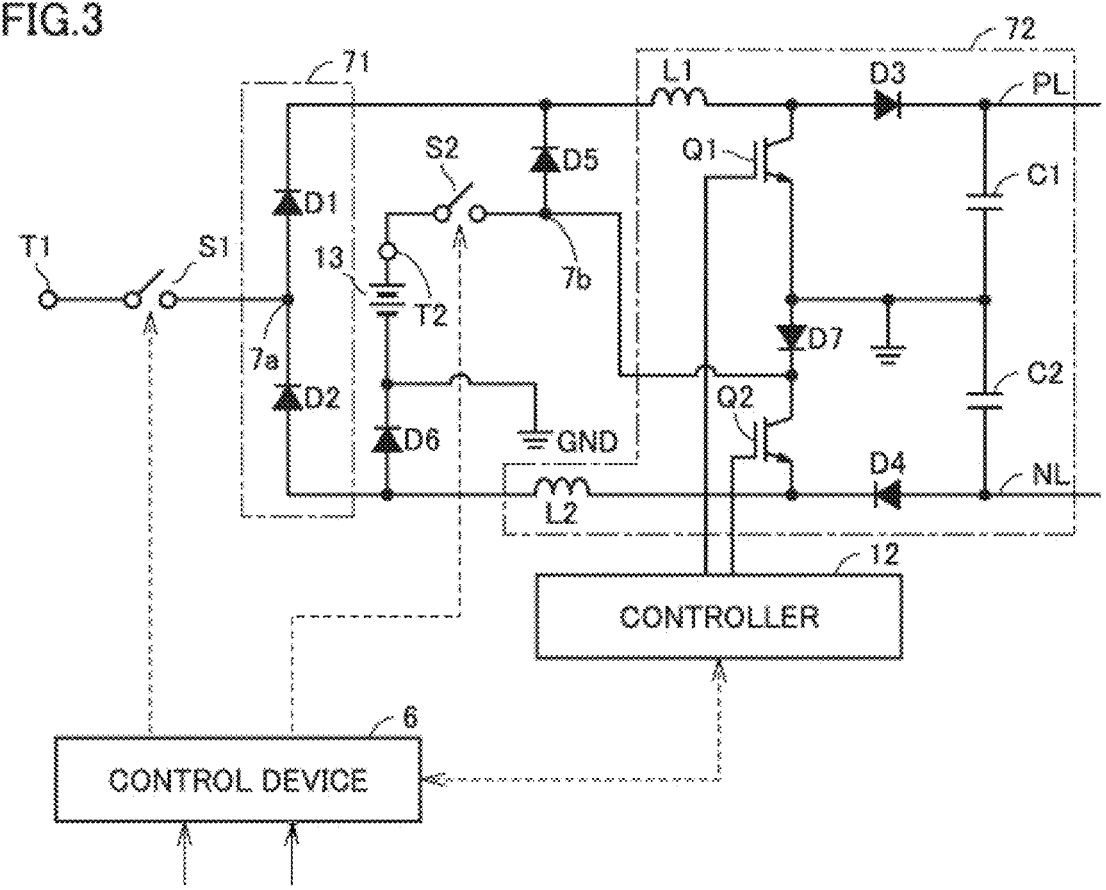
FIG. 3 is a circuit diagram showing a configuration example of a converter shown in FIG. 2.

Converter 7 is controlled by controller 12, and converts AC power from commercial AC power supply 1 into DC power and outputs the DC power to DC line 8. FIG. 3 is a circuit diagram showing a configuration example of converter 7 shown in FIG. 2. As shown in FIG. 3, converter 7 is a step-up high power factor converter, for example, having a rectifier 71 and a power factor correction (PFC) circuit 72.

Rectifier 71 is a full-wave-rectifying diode rectifier having diodes D1, D2. Rectifier 71 rectifies an AC voltage that is input to AC node 7a, and outputs the rectified voltage to DC line 8 (a DC positive bus PL, a DC negative bus NL). Rectifier 71 may be a thyristor rectifier.

PFC circuit 72 has semiconductor switching elements Q1, Q2, reactors L1, L2, diodes D3, D4, and capacitors C1, C2. IGBTs (Insulated Gate Bipolar Transistors) are applied, for example, to semiconductor switching elements Q1, Q2. Reactor L1, semiconductor switching element Q1 and diode D3 form a step-up circuit. Reactor L2, semiconductor switching element Q2 and diode D4 form a step-up circuit.

Converter 7 further has diodes D5, D6, D7. Battery 13 is connected to PFC circuit 72 through switch S2 and diodes D5, D6, D7. When switch S2 is turned on, inter-terminal voltage VB of battery 13 is input to PFC circuit 72.

When AC power is normally supplied from commercial AC power supply 1 (while commercial AC power supply 1 is normal), and switch S1 is ON, converter 7 converts AC power from commercial AC power supply 1 into DC power and outputs the DC power to DC line 8 (DC positive bus PL and DC negative bus NL). At this time, converter 7 is controlled so as to set DC voltage VDC on DC line 8 to a reference DC voltage VDCr.

When commercial AC power supply 1 fails, and switch S2 is ON, on the other hand, converter 7 performs a step-up operation of stepping up inter-terminal voltage VB of battery 13 and providing the stepped up voltage to DC line 8. In other words, converter 7 selectively performs either the operation of converting AC power from commercial AC power supply 1 into DC power and outputting the DC power to DC line 8, or the operation of stepping up inter-terminal voltage VB of battery 13 and outputting the stepped up voltage to DC line 8.

Referring back to FIG. 2, step-down chopper 10 is controlled by controller 12, and performs a step-down operation of stepping down DC voltage VDC on DC line 8 and providing the stepped down voltage to battery 13 when commercial AC power supply 1 fails. DC power is thus stored in battery 13. Step-down chopper 10 is of well-known type including a plurality of sets of IGBTs and diodes, and a reactor.

Inverter 11 is controlled by controller 12, and converts DC power supplied from converter 7 through DC line 8 into AC power of a commercial frequency and supplies the AC power to load 2. Inverter 11 is of well-known type including a plurality of sets of IGBTs and diodes.

(Operation of Uninterruptible Power Supply System)

An operation of uninterruptible power supply system 100 according to the embodiment will now be described.

Uninterruptible power supply system 100 according to the embodiment has an alternating-current (AC) power feeding mode and a battery power feeding mode as operation modes. Control device 6 selects either the AC power feeding mode or the battery power feeding mode as the operation mode, based on whether or not commercial AC power supply 1 has failed, and performs the selected operation mode. The AC power feeding mode corresponds to a "first power feeding mode," and the battery power feeding mode corresponds to a "second power feeding mode."

Figure 4:
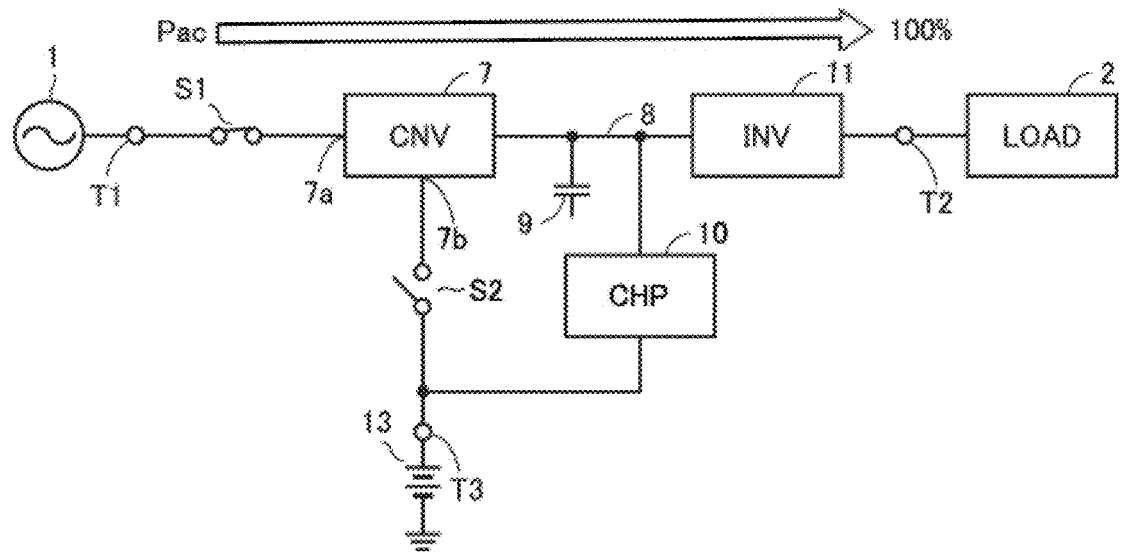
FIG. 4 is a circuit block diagram showing an AC power feeding mode (first power feeding mode).

FIG. 4 is a circuit block diagram showing the AC power feeding mode (first power feeding mode).

As shown in FIG. 4, while commercial AC power supply 1 is normal, control device 6 selects the AC power feeding mode. When the AC power feeding mode is selected, control device 6 turns on switch Si so that AC power is supplied from commercial AC power supply 1 to converter 7 through switch S1. Control device 6 also turns off switch S2.

In UPS 5, controller 12 controls converter 7 so as to convert AC power supplied from commercial AC power supply 1 through switch Si into DC power. Controller 12 also controls inverter 11 so as to convert DC power from converter 7 into AC power and supply the AC power to load 2. Controller 12 further controls step-down chopper 10 so as to store DC power from converter 7 in battery 13. As shown in FIG. 4, when output power from commercial AC power supply 1 is represented by Pac, and output power from inverter 11 is represented by Po, output power Po is basically equal to output power Pac during the AC power feeding mode.

Figure 5:
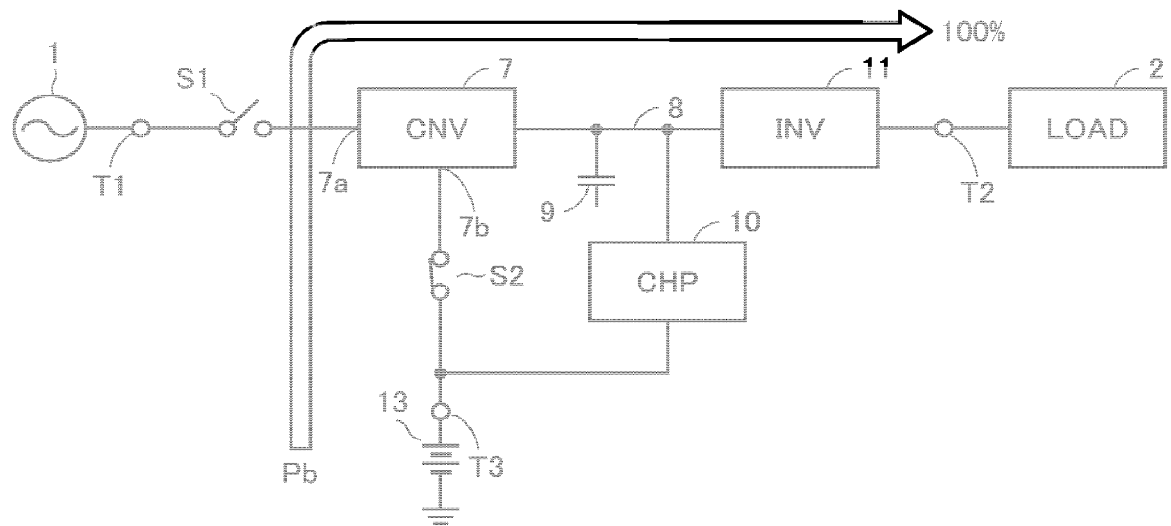
FIG. 5 is a circuit block diagram showing a battery power feeding mode (second power feeding mode).

FIG. 5 is a circuit block diagram showing the battery power feeding mode (second power feeding mode). When commercial AC power supply 1 fails during the execution of the AC power feeding mode, control device 6 selects the battery power feeding mode.

As shown in FIG. 5, when the battery power feeding mode is selected, control device 6 turns on switch S2 so that DC power is supplied from battery 13 to converter 7 through switch S2. Control device 6 also turns off switch S1.

In UPS 5, controller 12 controls converter 7 so as to step up DC power supplied from battery 13 through switch S2 and supply the stepped up power to inverter 11. Controller 12 also controls inverter 11 so as to convert DC power from converter 7 into AC power and supply the AC power to load 2. As shown in FIG. 5, when output power from battery 13 is represented by Pb, output power Po is equal to output power Pb during the battery power feeding mode.

Figure 6:
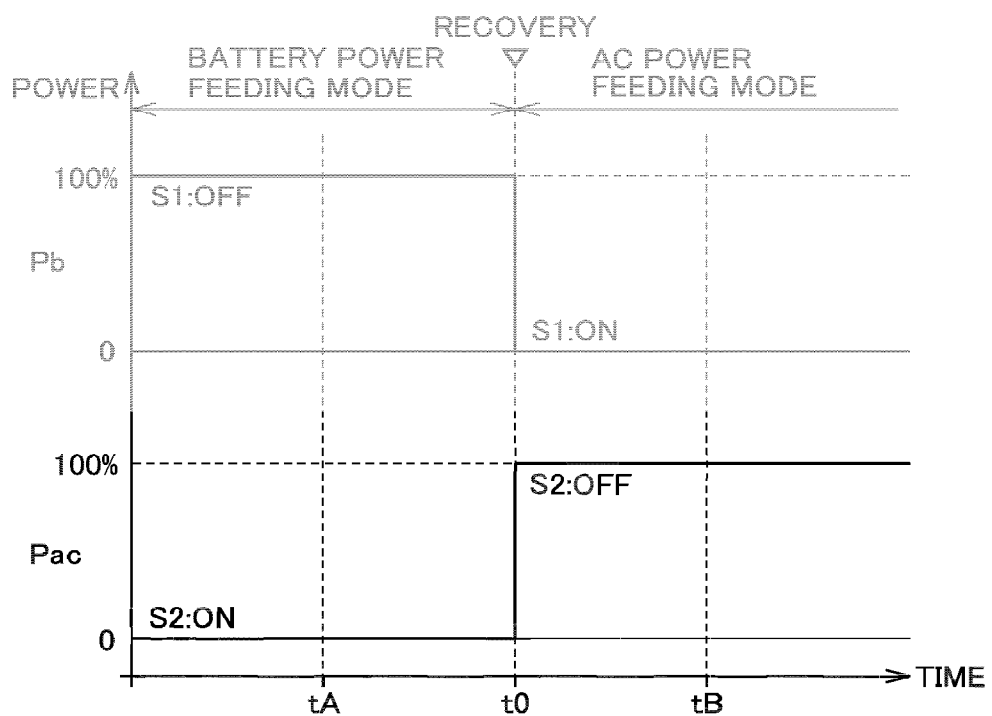
FIG. 6 is a timing chart showing a basic operation of the UPS when a commercial AC power supply recovers.

When commercial AC power supply 1 recovers during the execution of the battery power feeding mode, control device 6 selects the AC power feeding mode. When the AC power feeding mode is selected, control device 6 turns on switch Si again, and turns off switch S2 again, as shown in FIG. 4. FIG. 6 is a timing chart showing a basic operation of UPS 5 when commercial AC power supply 1 recovers.

In FIG. 6, the ordinate represents output power Pb from battery 13 and output power Pac from commercial AC power supply 1, and the abscissa represents time. For each of output powers Pb, Pac, output power Po from inverter 11 in one UPS 5 is defined as 100%. Output power Po from inverter 11 is equal to a power consumption P1 of load 2 that has been divided by number N of UPSs 5 (Po=P1/N).

In FIG. 6, time to is the timing when commercial AC power supply 1 fails. Time t0 is the timing when commercial AC power supply 1 recovers. Time tB is the timing when commercial AC power supply 1 is normal.

During a period prior to time tO (during failure of commercial AC power supply 1), UPS 5 is set to the battery power feeding mode. During the battery power feeding mode, control device 6 turns off switch S1 and turns on switch S2 in UPS 5.

When commercial AC power supply 1 recovers at time t0, UPS 5 is switched from the battery power feeding mode to the AC power feeding mode. At time t0, control device 6 turns on switch S1, and turns off switch S2. Thus, during a period subsequent to time t0 (while commercial AC power supply 1 is normal), UPS 5 is set to the AC power feeding mode.

When switch S1 is turned on at the time of recovery of commercial AC power supply 1 (time t0), as shown in FIG. 6, an inrush current may flow due to a rise of AC input voltage Vi, thus affecting commercial AC power supply 1 in terms of voltage variation and the like. It is concerned that this will cause a disturbance in another load (not shown) connected to commercial AC power supply 1.

In order to suppress the effect on the commercial AC power supply at the time of recovery, a conventional UPS employs soft start control in which the rise of an AC input voltage to a converter is made gradual. For example, in PTL 1, when the commercial AC power supply recovers, the converter is controlled so that the AC input voltage to the converter is gradually raised over the prescribed voltage raising time (dVi/dt). With the AC input voltage being gradually raised, an AC input current to the converter can also be gradually raised.

Further, in PTL 1, the discharge current of the battery is gradually reduced, while the AC input current to the converter is gradually increased, and accordingly, the current supplied to the load (in other words, an inverter output current) is maintained at a constant value. Thus, the load can continue operating in a stable manner when the commercial AC power supply recovers.

In the configuration example of UPS 5 shown in FIG. 3, however, step-down chopper 10 can only charge battery 13, and cannot discharge battery 13. In addition, converter 7 is capable of selecting and performing either the AC/DC conversion operation of converting AC power from commercial AC power supply 1 into DC power (see FIG. 4) or the discharge operation of stepping up inter-terminal voltage VB of battery 13 and providing the stepped up voltage to DC line 8 (see FIG. 5).

Since UPS 5 is configured so that converter 7 is used to serve both the power feeding from commercial AC power supply 1 (AC power feeding) and the power feeding from battery 13 (battery power feeding) in this manner, the AC power feeding and the battery power feeding cannot be performed simultaneously. In UPS 5, therefore, the discharge current of battery 13 cannot be gradually reduced while the AC input voltage to converter 7 is gradually raised, as in a conventional UPS. It is thus difficult to soft start UPS 5 when commercial AC power supply 1 recovers.

Therefore, uninterruptible power supply system 100 according to the present embodiment employs a configuration in which the plurality of UPSs 51 to 5N are connected in parallel, and successively switches these plurality of UPSs 51 to 5N to the AC power feeding mode when commercial AC power supply 1 recovers. Thus, a soft start is implemented in entire uninterruptible power supply system 100.

Figure 7:
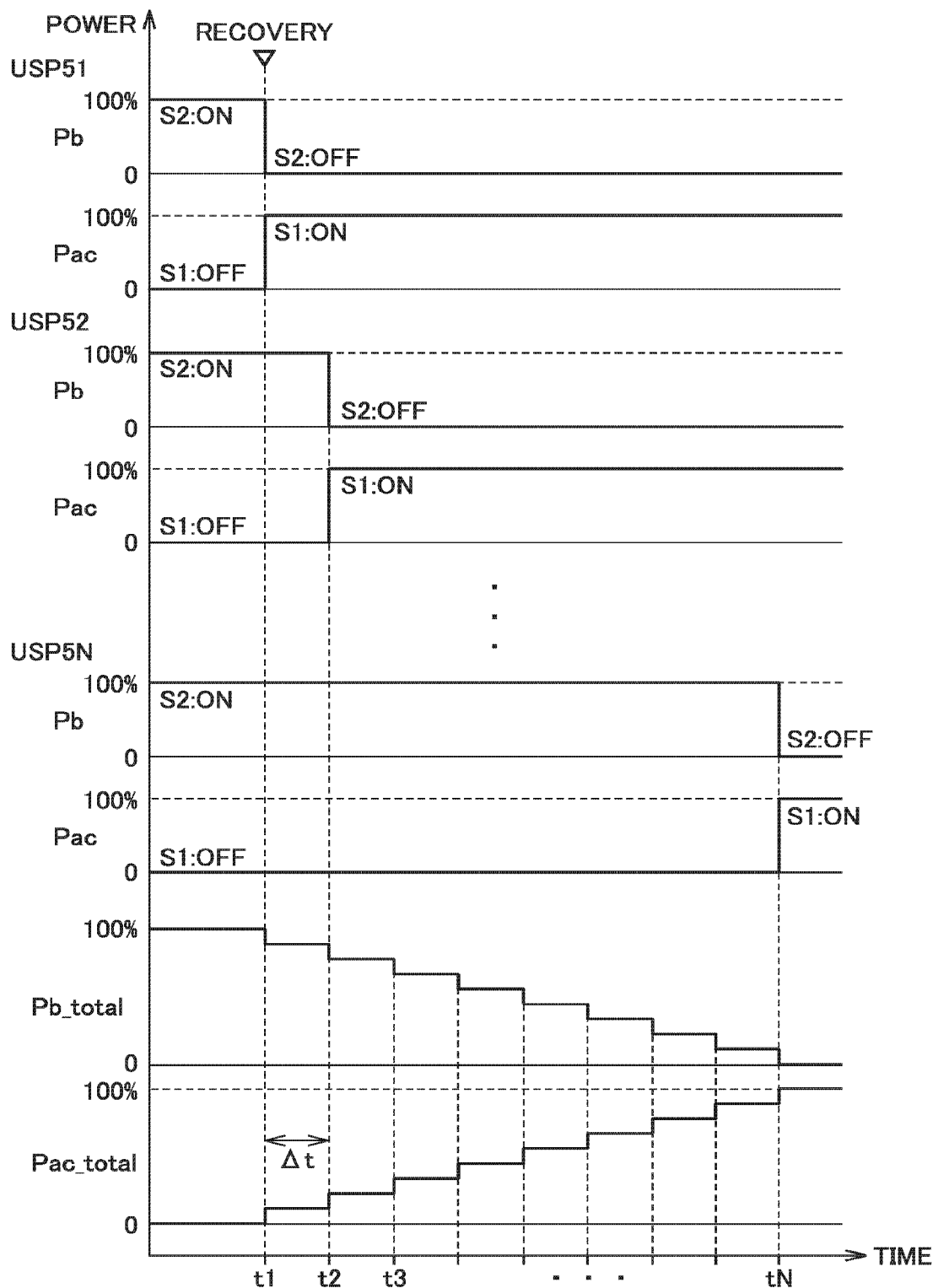
FIG. 7 is a timing chart showing an operation of the uninterruptible power supply system when the commercial AC power supply recovers.

FIG. 7 is a timing chart showing an operation of uninterruptible power supply system 100 when commercial AC power supply 1 recovers. In FIG. 7, the ordinate represents output power Pb from battery 13 and output power Pac from commercial AC power supply 1 in each UPS 5, as well as a total value Pb_total of output powers Pb and a total value Pac_total of output powers Pac in entire uninterruptible power supply system 100, and the abscissa represents time.

For each of output powers Pb, Pac, output power Po from inverter 11 in one UPS 5 is defined as 100%. Output power Po from inverter 11 is equal to power consumption P1 of load 2 that has been divided by number N of UPSs 5 (Po=P1/N). For each of output powers Pb_total, Pac_total, on the other hand, power consumption P1 of load 2 is defined as 100%.

In FIG. 7, time t1 is the timing when commercial AC power supply 1 recovers. In other words, during a period prior to time t1, the plurality of UPSs 51 to 5N are all set to the battery power feeding mode. In other words, switch S1 is OFF and switch S2 is ON in each UPS 5 (see FIG. 5). Output power Pb_total is equal to a total of output powers Pb from the plurality of UPSs 51 to 5N, and is equal to power consumption P1.

When commercial AC power supply 1 recovers at time t1, control device 6 successively switches the plurality of UPSs 51 to 5N to the AC power feeding mode. Specifically, control device 6 successively turns on the plurality of switches S1, and successively turns off the plurality of switches S2.

In the example of FIG. 7, control device 6 first turns on switch S1 and turns off switch S2 in first UPS 51. At this time, control device 6 maintains switches S1 in the off state and maintains switches S2 in the on state in remaining (N−1) UPSs 52 to 5N. Thus, at time t1, only first UPS 51 is switched to the AC power feeding mode.

As a result of the switching of first UPS 51 to the AC power feeding mode at time t1, output power Pb_total is reduced by output power Pb, and output power Pac_total is increased by output power Pac. Since Pb=Pac=Po holds, the power supplied from uninterruptible power supply system 100 to load 2 is maintained at a constant value.

Then, at time t2 when a prescribed time Δt has elapsed since time t1, control device 6 turns on switch S1 and turns off switch S2 in second UPS 52. At this time, control device 6 maintains switches S1 in the off state and maintains switches S2 in the on state in remaining (N−2) UPSs 53 to 5N. Thus, at time t2, only second UPS 52 is switched to the AC power feeding mode. As a result, first UPS 51 and second UPS 52 perform the AC power feeding mode, and third to Nth UPSs 53 to 5N perform the battery power feeding mode.

As a result of the switching of second UPS 52 to the AC power feeding mode at time t2, output power Pb_total is further reduced by output power Pb, and output power Pac_total is further increased by output power Pac. Since Pb=Pac=Po holds, the power supplied from uninterruptible power supply system 100 to load 2 is maintained at a constant value.

During a period between time t3 when prescribed time Δt has elapsed since time t2 and time tN, control device 6 successively switches remaining (N−2) UPSs 53 to 5N to the AC power feeding mode. Each time UPS 5 is switched to the AC power feeding mode, output power Pb_total is reduced by output power Pb, and output power Pac_total is increased by output power Pac. Since Pb=Pac=Po holds, the power supplied from uninterruptible power supply system 100 to load 2 is maintained at a constant value.

When Nth UPS 5N is switched to the AC power feeding mode at time tN, the plurality of UPSs 51 to 5N are all set to the AC power feeding mode. Output power Pac_total is equal to a total of output powers Pac from the plurality of UPSs 51 to 5N, and is equal to power consumption P1.

In this manner, control device 6 successively switches the plurality of UPSs 51 to 5N to the AC power feeding mode by successively turning on switches S1 and successively turning off switches S2 in the plurality of UPSs 51 to 5N. Thus, gradual switching from the battery power feeding to the AC power feeding takes place in entire uninterruptible power supply system 100 when commercial AC power supply 1 recovers. After time t1, in response to the successive switching of the plurality of UPSs 51 to 5N to the AC power feeding mode, a soft start is implemented in which AC input voltage Vi and AC input current Ii from commercial AC power supply 1 are gradually raised. Thus, the effect on commercial AC power supply 1 at the time of recovery can be suppressed. In addition, since AC input voltage Vi and AC input current Ii are gradually raised and the discharge current of battery 13 is gradually reduced, it is possible to continue to supply the constant power to load 2 at the time of recovery as well.

Although FIG. 7 illustrates a configuration in which the plurality of UPSs 51 to 5N are successively switched one by one to the AC power feeding mode, the plurality of UPSs 51 to 5N may be divided into a plurality of groups each including one or a plurality of UPSs, and successively switched to the AC power feeding mode on a group-by-group basis.

Although FIG. 7 illustrates a configuration in which the plurality of UPSs 51 to 5N are successively switched to the AC power feeding mode with a constant time difference (prescribed time Δt), time difference Δt does not necessarily need to be constant.

Other Configuration Examples

Figure 8:
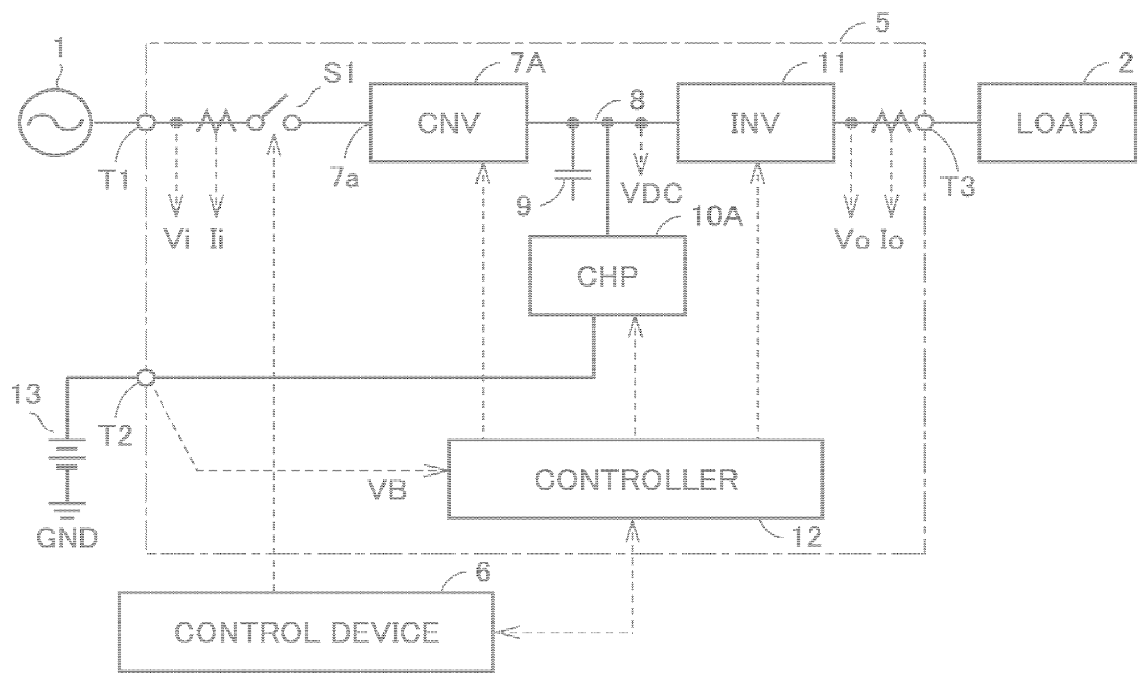
FIG. 8 is a block diagram showing another configuration example of the UPS shown in FIG. 1.

Although UPS 5 is described in the embodiment above as being configured so that converter 7 is used to serve both the AC power feeding and the battery power feeding, the present invention is also applicable to a UPS configured so that the AC power feeding and the battery power feeding are performed independently of each other in a converter and a chopper. FIG. 8 is a block diagram showing another configuration example of UPS 5 shown in FIG. 1. In UPS 5 according to the present variation, switch S2 (second switch) is removed from UPS 5 shown in FIG. 2, and converter 7 and step-down chopper 10 are replaced by a converter 7A and a bidirectional chopper 10A, respectively. Converter 7A, DC line 8, capacitor 9, bidirectional chopper 10A and inverter 11 form a "power conversion device."

Converter 7A is controlled by controller 12, and converts AC power from commercial AC power supply 1 into DC power and outputs the DC power to DC line 8. Converter 7A is a PWM (Pulse Width Modulation) converter, for example. Converter 7 is of well-known type including a plurality of sets of IGBTs and diodes.

While commercial AC power supply 1 is normal, and switch S1 is ON, converter 7 converts AC power from commercial AC power supply 1 into DC power and outputs the DC power to DC line 8. At this time, converter 7 is controlled so as to set DC voltage VDC on DC line 8 to reference DC voltage VDCr. When commercial AC power supply 1 fails, on the other hand, controller 12 causes converter 7 to stop operating.

Bidirectional chopper 10A is controlled by controller 12, and supplies and receives DC power between DC line 8 and battery 13. Bidirectional chopper 10A is of well-known type including a plurality of sets of IGBTs and diodes, and a reactor. Bidirectional chopper 10A selectively performs either a step-down operation of stepping down DC voltage VDC on DC line 8 and providing the stepped down voltage to battery 13, or a step-up operation of stepping up inter-terminal voltage VB of battery 13 and providing the stepped up voltage to DC line 8.

While commercial AC power supply 1 is normal, bidirectional chopper 10A supplies DC power from DC line 8 to battery 13 so as to set inter-terminal voltage VB of battery 13 to a reference battery voltage VBr. When commercial AC power supply 1 fails, on the other hand, bidirectional chopper 10A supplies DC power from battery 13 to DC line 8 so as to set DC voltage VDC on DC line 8 to reference DC voltage VDCr. Thus, DC power corresponding to output power Po from inverter 11 is supplied only from battery 13.

According to UPS 5 in the present variation, the AC power feeding is performed by converter 7A, and the battery power feeding is performed by bidirectional chopper 10A. Accordingly, when commercial AC power supply 1 recovers, controller 12 can implement a soft start by performing control so as to gradually increase the AC input current to converter 7A and gradually reduce the discharge current of battery 13, as in a conventional UPS.

According to uninterruptible power supply system 100 in the present embodiment, however, the plurality of UPSs 51 to 5N connected in parallel with respect to commercial AC power supply 1 are successively switched to the AC power feeding mode, thus allowing a soft start to be implemented in entire uninterruptible power supply system 100, without the need for each UPS 5 to perform the conventional soft start control.

Specifically, control device 6 successively switches the plurality of UPSs 51 to 5N to the AC power feeding mode by providing a difference in timing to turn on switch S1 among the plurality of UPSs 51 to 5N. In each UPS 5, when switch S1 is turned on, controller 12 causes bidirectional chopper 10A to stop its step-up operation. Thus, as in the timing chart of FIG. 7, output power Pac_total can be gradually increased, and output power Pb_total can be gradually reduced.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 commercial AC power supply; 2 load; 5, 51 to 5N UPS; 7 converter; 8 DC line; 9 capacitor; 10 step-down chopper; 10A bidirectional chopper; 11 inverter; 12 controller; 13 battery (power storage device); 100 uninterruptible power supply system; Si switch (first switch); S2 switch (second switch).

The invention claimed is:

1. An uninterruptible power supply system comprising:
   a plurality of uninterruptible power supplies connected in parallel between an AC power supply and a load; and
   a control device that controls the plurality of uninterruptible power supplies,
   the plurality of uninterruptible power supplies each including
      a first switch connected between the AC power supply and an AC node, and
      a power conversion device configured to selectively receive power from one of the AC node and a power storage device, generate AC power, and supply the AC power to the load, wherein
   the control device sets the plurality of uninterruptible power supplies to a first power feeding mode while the AC power supply is normal, and sets the plurality of uninterruptible power supplies to a second power feeding mode when the AC power supply fails,
   during the first power feeding mode, the control device turns on the first switch, and controls the power conversion device so as to receive AC power from the AC node and generate AC power,
   during the second power feeding mode, the control device turns off the first switch, and controls the power conversion device so as to receive DC power from the power storage device and generate AC power,
   when the AC power supply recovers during the second power feeding mode, the control device successively switches the plurality of uninterruptible power supplies to the first power feeding mode by successively turning on a plurality of the first switches each of which corresponds to each of the plurality of uninterruptible power supplies, wherein
   the power conversion device includes
      a converter having the AC node, and a DC node that receives DC power from the power storage device, that selectively receives power from one of the AC node and the DC node and generates DC power,
      an inverter that converts DC power supplied from the converter into AC power and supplies the AC power to the load, and
      a second switch connected between the power storage device and the DC node,
   during the first power feeding mode, the control device turns on the first switch, and turns off the second switch, during the second power feeding mode, the control device turns off the first switch, and turns on the second switch, and when the AC power supply recovers during the second power feeding mode, the control device successively switches the plurality of uninterruptible power supplies to the first power feeding mode by successively turning on the plurality of first switches and successively turning off a plurality of the second switches each of which corresponds to each of the plurality of uninterruptible power supplies.

2. The uninterruptible power supply system according to claim 1, wherein the converter has
   a rectifier that receives AC power from the AC node, and
   a power factor correction circuit that receives output from the rectifier, and
the power storage device is connected to the power factor correction circuit through the second switch.

3. An uninterruptible power supply system comprising:
a plurality of uninterruptible power supplies connected in parallel between an AC power supply and a load; and
a control device that controls the plurality of uninterruptible power supplies,
the plurality of uninterruptible power supplies each including
   a first switch connected between the AC power supply and an AC node, and
   a power conversion device configured to selectively receive power from one of the AC node and a power storage device, generate AC power, and supply the AC power to the load, wherein
the control device sets the plurality of uninterruptible power supplies to a first power feeding mode while the AC power supply is normal, and sets the plurality of uninterruptible power supplies to a second power feeding mode when the AC power supply fails,
during the first power feeding mode, the control device turns on the first switch, and controls the power conversion device so as to receive AC power from the AC node and generate AC power,
during the second power feeding mode, the control device turns off the first switch, and controls the power conversion device so as to receive DC power from the power storage device and generate AC power, and
when the AC power supply recovers during the second power feeding mode, the control device successively switches the plurality of uninterruptible power supplies to the first power feeding mode by successively turning on a plurality of the first switches each of which corresponds to each of the plurality of uninterruptible power supplies, wherein the power conversion device includes
   a converter that converts AC power from the AC node into DC power,
   an inverter that selectively receives DC power from the converter and the power storage device and converts the DC power into AC power, and
   a bidirectional chopper that supplies and receives DC power between the inverter and the power storage device, during the first power feeding mode, the control device turns on the first switch, and controls the converter and the inverter so as to receive AC power from the AC node and generate AC power, and during the second power feeding mode, the control device turns off the first switch, and controls the bidirectional chopper and the inverter so as to receive DC power from the power storage device and generate AC power, and when the AC power supply recovers during the second power feeding mode, the control device successively switches the plurality of uninterruptible power supplies to the first power feeding mode by successively turning on the plurality of first switches and successively causing a plurality of the bidirectional choppers each of which corresponds to each of the plurality of uninterruptible power supplies to stop operating.

* * * * *